United States Patent
Thacher et al.

(10) Patent No.: US 7,221,386 B2
(45) Date of Patent: May 22, 2007

(54) CAMERA FOR COMMUNICATION OF STREAMING MEDIA TO A REMOTE CLIENT

(75) Inventors: Kerry E. Thacher, Winnipeg (CA); Christopher T. Kavanagh, Winnipeg (CA); Conway A. Wieler, Winnipeg (CA); Robert R. McConnell, Winnipeg (CA); Timothy N. Braun, Winnipeg (CA); Donald A. Freiling, Winnipeg (CA); Kent D. Wotherspoon, Winnipeg (CA); William J. Gillanders, Oakbank (CA)

(73) Assignee: Librestream Technologies Inc., Winnipeg, Manitoba (CA)

( * ) Notice: Subject to any disclaimer, the term of this patent is extended or adjusted under 35 U.S.C. 154(b) by 0 days.

(21) Appl. No.: 10/959,042

(22) Filed: Oct. 7, 2004

(65) Prior Publication Data

US 2005/0073575 A1    Apr. 7, 2005

Related U.S. Application Data

(60) Provisional application No. 60/592,137, filed on Jul. 30, 2004, provisional application No. 60/508,861, filed on Oct. 7, 2003.

(51) Int. Cl.
*H04N 7/14* (2006.01)

(52) U.S. Cl. .............................. 348/14.02; 348/14.03; 348/14.05

(58) Field of Classification Search .. 348/14.01–14.16, 348/373, 552, 211.99, 211.1–211.3; 455/556.1
See application file for complete search history.

(56) References Cited

U.S. PATENT DOCUMENTS

| | | | |
|---|---|---|---|
| 5,847,752 A * | 12/1998 | Sebestyen | 348/14.12 |
| 5,933,479 A * | 8/1999 | Michael et al. | 379/110.01 |
| 6,327,276 B1 | 12/2001 | Robert et al. | |
| 6,396,537 B1 * | 5/2002 | Squilla et al. | 348/14.02 |
| 6,466,252 B1 | 10/2002 | Miyazaki | |
| 6,473,631 B1 * | 10/2002 | Siddoway et al. | 348/14.02 |
| 6,611,503 B1 | 8/2003 | Fitzgerald et al. | |
| 6,760,749 B1 | 7/2004 | Dunlap et al. | |
| 6,906,741 B2 * | 6/2005 | Canova et al. | 348/14.08 |
| 6,940,543 B2 * | 9/2005 | Perotti et al. | 348/211.2 |
| 6,956,614 B1 * | 10/2005 | Quintana et al. | 348/373 |
| 6,978,010 B1 * | 12/2005 | Short et al. | 379/388.03 |
| 2001/0052928 A1 * | 12/2001 | Imagawa et al. | 348/14.12 |
| 2002/0036698 A1 * | 3/2002 | Mizutani | 348/232 |
| 2002/0068600 A1 * | 6/2002 | Chihara et al. | 348/14.02 |
| 2002/0097333 A1 * | 7/2002 | Wechsler et al. | 348/373 |
| 2003/0104806 A1 | 6/2003 | Ruef et al. | |
| 2003/0123865 A1 * | 7/2003 | Hofer et al. | 396/72 |

(Continued)

FOREIGN PATENT DOCUMENTS

JP        06141308 A  *  5/1994

*Primary Examiner*—Stella Woo
(74) *Attorney, Agent, or Firm*—Adrian D. Barrison; Michael R. Williams; Ryan W. Dupuis (57) ABSTRACT

A Mobile Streaming Camera is operable by an Operator for communication with one of more Remote Clients through a wireless network allows compressed communication of video and audio in both directions together with voice signals in a telephony type communication. The remote client is able to control the operation by voice signals or direct control. A video display at the Camera and at the remote client allows communication of additional data.

18 Claims, 5 Drawing Sheets

Basic System Block Diagram

U.S. PATENT DOCUMENTS

2003/0128272 A1*  7/2003  Clough et al. ........... 348/14.02
2003/0177500 A1*  9/2003  Nakamura et al. ..... 348/211.99
2004/0003151 A1*  1/2004  Bateman et al. .............. 710/72
2004/0179092 A1*  9/2004  LaPoint ................... 348/14.02

* cited by examiner

Figure 1 – Basic System Block Diagram

Figure 2 – MSC Block Diagram

Figure 3 – MCS Rear View, Controls

Figure 5 - Complete System Block Diagram

CAMERA FOR COMMUNICATION OF STREAMING MEDIA TO A REMOTE CLIENT

This application claims priority under 35 U.S.C.119 from U.S. Provisional Application Ser. No. 60/508,861 filed Oct. 7, 2003 and U.S. Provisional Application Ser. No. 60/592,137 filed Jul. 30, 2004.

This invention relates to a device for use with streaming media and is used in conjunction with compatible remote client devices to create a mobile conferencing system.

BACKGROUND OF THE INVENTION

The Internet and several new technologies are combining to allow anywhere/anytime communications. High data rate wireless technologies such as IEEE 802.11 allow people to remain in touch electronically from virtually anywhere in the world. With the current state-of-the-art, it is possible for an individual to communicate with another individual or group, by exchanging electronic mail, using instant messaging services, or carrying on a conversation with Internet enabled telephones. With sufficient bandwidth, it is possible to send video over then Internet.

Existing video conferencing systems are beginning to exploit the ubiquitous connectivity of the Internet instead of relying exclusively on ISDN or other forms of dedicated communications links. Conventional videoconferencing systems have been designed in a way whereby the subject material must be brought to the conference—for example into a meeting room that has been equipped with a system, or to a PC that has been equipped to function as a videoconferencing system. In most cases, the subject material is an individual or group who wish to communicate in real-time with another individual or group. Some video conferencing systems also include the capability to send images of small devices that can be placed near the videoconferencing equipment. These systems cannot be used in many settings such as a factory floor, test lab or an inspection station where small size and complete mobility is required. Nevertheless, there is value in being able to participate in a video conference from these locations.

Another alternative for these types of locations is a wearable computer system where an operator wears a head-mounted camera and microphone, which connect to a wearable computer that is able to establish a communications session with a remote person. These systems are currently restricted in their functionality, and are cumbersome to use in most circumstances. Most workers will find that the inconvenience of needing to wear computing equipment will diminish the value that these systems offer. As such they are most suitable for specialized and somewhat rare circumstances.

What is needed is a streaming media apparatus that is truly portable with no wires of any sort that can be used as easily and quickly as telephone with the key difference being the addition of high quality, real-time video communications. Furthermore, the portable apparatus needs to incorporate the major functions of a traditional video conferencing system in a small package not unlike a traditional camera, that can be used from virtually any location whether this location is outdoors, or in an industrial environment such as a factory floor. This will allow the conference to be brought to the subject material, which will dramatically improve the usefulness of video-based communications.

Enterprises that engage in the development, manufacture and maintenance of expensive and complex products can take advantage of such a system to reduce the time to market and lower the costs of developing new products. Numerous issues arise during the product development process that slow down or completely halt the process. Missed delivery dates and cost overruns are typical outcomes. These outcomes are severe, given the time-to-market demands and multimillion dollar costs associated with the development and introduction of many new products. A mobile collaboration system that can "go to where the problem is" and provide real time video, audio and other collaboration tools to remote experts on their PCs where ever they are, has the potential to significantly reduce the time and cost required to resolve problems.

As an example, consider the scenario where a multi-million dollar milling machine has broken down. Lost revenues of hundreds of dollars an hour could result from the machine breakdown. On-site technical support is unable to fix the problem and the milling machine owner must call in a technical expert from the machines manufacturer to affect the repair. Technician availability, travel time and travel costs only amplify the problem. With a mobile video collaboration system, the on-site technician could take the digital camera out to the milling machine, connect to the manufacturer's technical expert back at their head office via the internet and have the expert guide him through the repair.

This scenario illustrates just one way this product can be used. Many other uses are possible.

SUMMARY OF THE INVENTION

According to a first aspect of the invention there is provided an apparatus comprising:

a Mobile Streaming Camera, operable by an Operator for communication with a Remote Client having:

a mobile camera housing;

a battery power supply mounted in the housing;

a camera module and lens therefor mounted on the camera housing;

a video display for displaying to the operator video signals;

a manual control input for manual control by the operator of the camera module and lens for generating video signals;

an audio output for supplying audio and voice communications to the operator;

at least one audio input for receiving audio and voice communications from the operator and the surroundings;

network connections for wireless connection to a network;

a processing subsystem in the housing;

the processing subsystem being arranged to receive video from the camera module and audio and voice communications from the audio input for compressing the video, audio and voice;

the processing subsystem being arranged to provide communications protocols for communication of the video, audio and voice signals for transmission in real time to the network;

the processing subsystem being arranged to receive from the network compressed video, audio and voice signals and to decompress the signals for, in real time, display of the video signals on the display and output of the audio and voice to the operator;

the camera being arranged for communication with the remote client where the remote client has:

a video display;

an audio output for audio and voice;

an audio input for at least voice;

a network connection for connection to the network;

and a processing subsystem;

the processing subsystem of the remote client being arranged to receive compressed video, audio and voice signals from the camera unit through the network for decompression and output in real time on the display and the audio output;

the processing subsystem being arranged to provide communications protocols for communication of at least voice signals for transmission in real time to the network.

Preferably the Mobile Streaming Camera is arranged to initiate, receive and participate in mobile, real time, full duplex voice and video calls with the Remote Client.

Preferably the Mobile Streaming Camera is arranged to initiate, receive, and participate in a mobile, real-time, full-duplex voice and video conference call with multiple Remote Clients through a connection to a Conferencing Server.

Preferably the Mobile Streaming Camera is arranged to distribute video streams to multiple Remote Clients through a connection to a Video Distribution Server.

Preferably the Mobile Streaming Camera is arranged to interface with a Registration server and a Directory Server to establish network presence and obtain information about Remote Clients necessary to establish connections with them.

Preferably the Mobile Streaming Camera includes a touch panel overlaid on top of the video display.

Preferably the Mobile Streaming Camera includes interfaces to connect with external audio, video and control sources whereby the Mobile Streaming Camera can receive audio and video delivered by external audio and video.

Preferably the Mobile Streaming Camera includes a directional microphone for capturing audio from a subject and an omni-directional microphone for capturing the Operators voice.

Preferably the Mobile Streaming Camera includes a loud speaker.

Preferably the Mobile Streaming Camera includes a connector for connecting a headset.

Preferably the Mobile Streaming Camera includes a radio transceiver and antenna for connecting to a wireless headset.

Preferably the Mobile Streaming Camera includes an illumination system and wherein the device can control illumination brightness levels by varying the power transferred to the illumination system elements, manually under operator control and/or remotely by the Remote Client and/or automatically under device software control.

Preferably automatic control of the illumination system brightness allows for on/off control with preset control of the on brightness level as well as for continuous and variable brightness control where brightness level computed using camera exposure parameters reported by the internal camera module.

Preferably the Mobile Streaming Camera includes a Backlight for the video display wherein the brightness level of the Backlight can be controlled by adjusting the power transferred to the backlight such that brightness levels can be controlled manually by the Operator to select the desired brightness level setting from a menu presented on the video display and/or brightness levels can be controlled automatically by the device by computing the optimum brightness level using camera exposure parameters reported by the internal camera module.

Preferably the Mobile Streaming Camera is arranged to automatically select the appropriate illumination element bank or banks to turn on based on the subject distance from the device where the distance is computed from focus parameters reported by the camera module.

Preferably the video display includes an overlaid touch panel which are arranged to provide the Operator with context sensitive controls, status indicators and information about the device and its operations.

Preferably the processing subsystem of the Mobile Streaming Camera is arranged to digitize the video signal and then compresses it using a video compression algorithm.

Preferably the processing subsystem of the Mobile Streaming Camera is arranged to capture individual video frames from the built-in camera or connected external video source, and process them into picture format.

Preferably the processing subsystem of the Mobile Streaming Camera is arranged to digitize audio and then compresses it using an audio compression algorithm.

Preferably the processing subsystem of the Mobile Streaming Camera is arranged to digitize the Operator's voice and compress it using a voice audio compression algorithm.

Preferably the Mobile Streaming Camera includes a wired network interface.

Preferably the Mobile Streaming Camera is arranged to transmit captured pictures to the Remote Client.

Preferably the Mobile Streaming Camera is arranged to provide a full duplex telephony speaker phone capability, utilizing echo cancellation and a built-in speaker and voice microphone during VoIP communications.

Preferably the Mobile Streaming Camera is arranged to allow the Operator to monitor the raw video signal acquired from the video camera on the video display.

Preferably the Mobile Streaming Camera is arranged to allow the Operator to monitor the compressed video signal on the video display.

Preferably the Mobile Streaming Camera is arranged to allow the Operator to monitor both raw video from the camera module, the compressed video signal being sent to the Remote Client, the compressed video received from the Remote Client or combinations there of simultaneously in separate windows on the video display.

Preferably the Mobile Streaming Camera is arranged to allow the Operator to monitor audio captured from a Directional Microphone using a connected headset.

Preferably the processing subsystem of the Mobile Streaming Camera is arranged to store stream content and pictures to a memory device.

Preferably the Mobile Streaming Camera is arranged to provide a capability to the Operator to allow voice annotation of content stored in a memory device of the Mobile Streaming Camera.

Preferably the Mobile Streaming Camera is arranged to simultaneously do any combination of the following:

stream content to the Remote Client;

receive and display stream content from the Remote Client, store stream content on a memory device;

allow the Operator to participate in a full duplex voice and video call with the Remote Client;

and monitor the video and Audio stream content being sent to the Remote Client.

Preferably the Mobile Streaming Camera is arranged to retrieve content stored on a memory device of the Mobile Streaming Camera and simultaneously do any combination of the following:

stream stored content to the Remote Client;

receive and play stream content from the Remote Client, allow an Operator to participate in a full duplex voice and video call with the Remote Client;

and monitor the video and audio stream content being sent to the Remote Client.

Preferably the Mobile Streaming Camera is arranged to allow the Operator to designate an area on the video image displayed on the video display to be used by the device for computing camera exposure control parameters.

Preferably the Mobile Streaming Camera is arranged to provide a capability that allows the Operator to use a Stylus, the video display and a Touch Panel associated with the video display to remotely control a cursor on the video display of the Remote Client.

Preferably the Mobile Streaming Camera is arranged to provide a capability that allows the operator to use a Stylus, the video display and a Touch Panel associated with the video display to draw images on top of the video being displayed on the video display of the Remote Client.

Preferably the Mobile Streaming Camera is arranged to allow the Remote Client, through the use of a pointing devices connected to the Remote Client, to control a cursor displayed on the video display of the Mobile Streaming Camera and the video display of the Remote Client.

Preferably the Mobile Streaming Camera is arranged to allow the Remote Client, through the use of a pointing device connected to the Remote Client, to draw images on top of the video being displayed on the video display of the Mobile Streaming Camera and the video display of the Remote Client.

Preferably the Mobile Streaming Camera is arranged to compute the optimum highest contrast ink colour to be used for drawing on the video display of the Mobile Streaming Camera and the video display of the Remote Client.

Preferably the Mobile Streaming Camera is arranged to adapt to available network bandwidth by receiving network performance metrics from the Remote Client and adjusting the media stream parameters to optimize the use of the network.

Preferably the Mobile Streaming Camera is arranged to encrypt all or some of the content transferred to the Remote Client using an encryption algorithm.

Preferably the Mobile Streaming Camera is arranged to decrypt encrypted content received from the Remote Client using an encryption algorithm.

Preferably the Mobile Streaming Camera is arranged to provide a Remote Control capability that allows the Remote Client to control the functions of the Mobile Streaming Camera.

Preferably the Mobile Streaming Camera is arranged to provide an interface to a docking station to acquire power for operating the device and for charging the internal battery and wherein the device provides a Remote Locator function which reports a unique docking station ID to the Remote Client that it acquires from the docking station to which the device is docked.

Preferably the Mobile Streaming Camera is arranged to traverse network access/firewall equipment.

Preferably the Mobile Streaming Camera is arranged to provides a telephony like connection environment for the Operator and the Client in which connection requests (calls) from one party to the other behave like phone calls, such that:

The call recipient can respond to the incoming call in ways such as but not limited to: automatically ignore, automatically answer, prompt the Remote Client/Operator to manually answer/ignore.

In the event that the Remote Client/Operator is already engaged in a connection with another Mobile Streaming Camera the Remote Client will respond to this new connection request as busy.

Audible and visual notifications are provided by the Remote Client and by the Mobile Streaming Camera to the Operator that the Mobile Streaming Camera is attempting to connect.

In the event that a connection is not established the initiator (Operator or Remote Client) can leave a message consisting of a VoIP voice clip and/or a subject audio and video clip for the recipient on the Mobile Streaming Camera/Remote Client.

Preferably the Mobile Streaming Camera is arranged to compute the straight line distance to the subject by utilizing optical parameters obtained from the camera module.

Thus the Mobile Streaming Camera is a generally camera shaped device comprised of a housing, a video camera, a color display, a Processing Subsystem, and components including a battery, an audio subsystem with a codec that interfaces with speakers and microphones, and/or a headset interface, telephony software, audio compression/decompression software and hardware, video compression/decompression software and hardware, echo cancellation software, an Ethernet interface, a radio and a power supply that can accept power from an AC adaptor or battery, which combine to convert the sounds and images from a subject into audio and video signals suitable for distribution over a network using Internet Protocol. This device has the following features and advantages:

it contains network connectivity utilizing Internet Protocol that allows sounds and video information to be captured and immediately shared with others who have a network connection, including those with access to the Internet;

it provides telephony functionality so that device operators can be in voice contact with others who have a network connection, including those with access to the Internet;

the integration of wireless networking capability allows mobile device operators to be in constant communication with other individuals who have a network/Internet connection.

DETAILED DESCRIPTION

Figure 1:
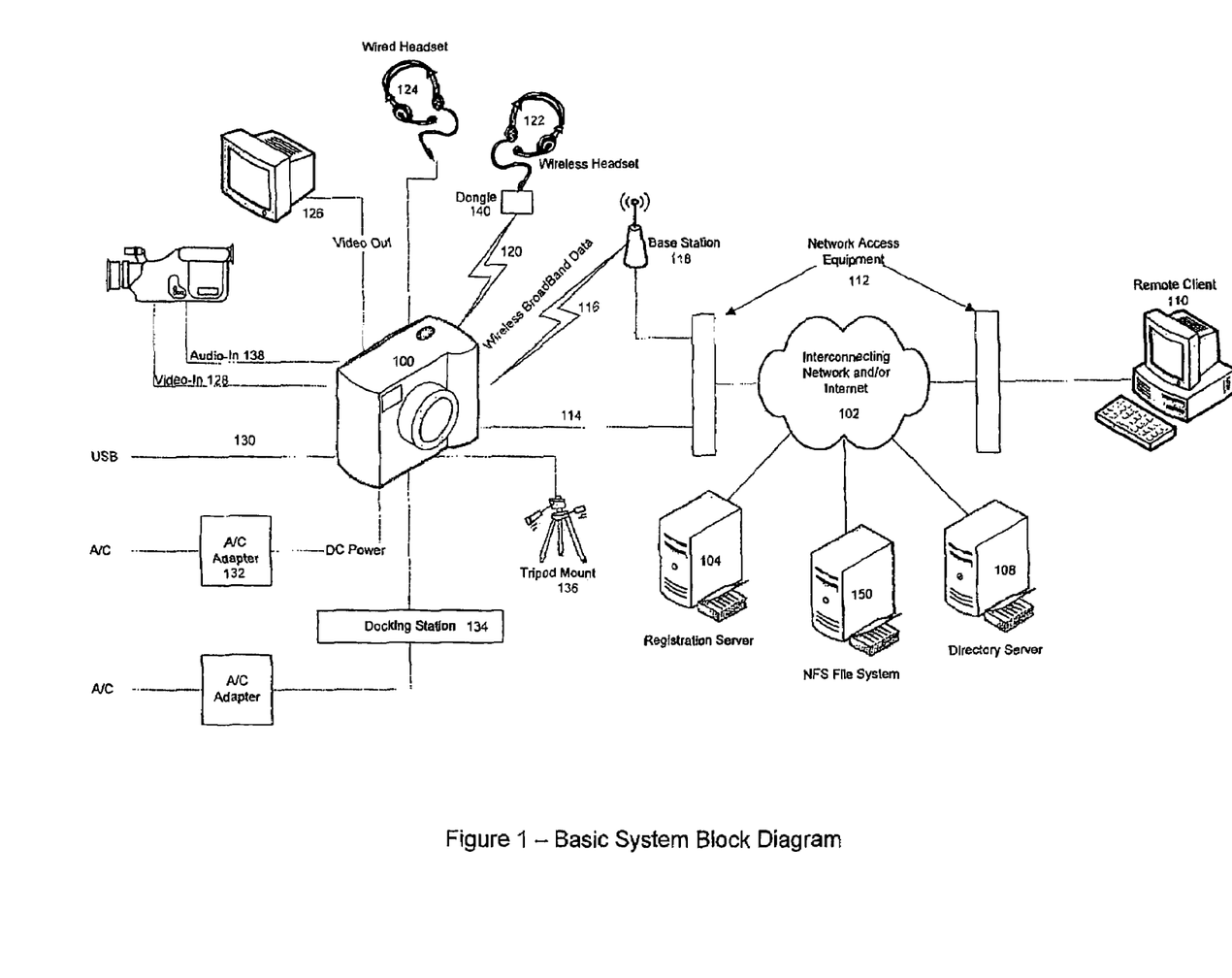
FIG. 1 is a Basic System Diagram which illustrates the overall basic system and how this invention relates to such a system.
Figure 5:
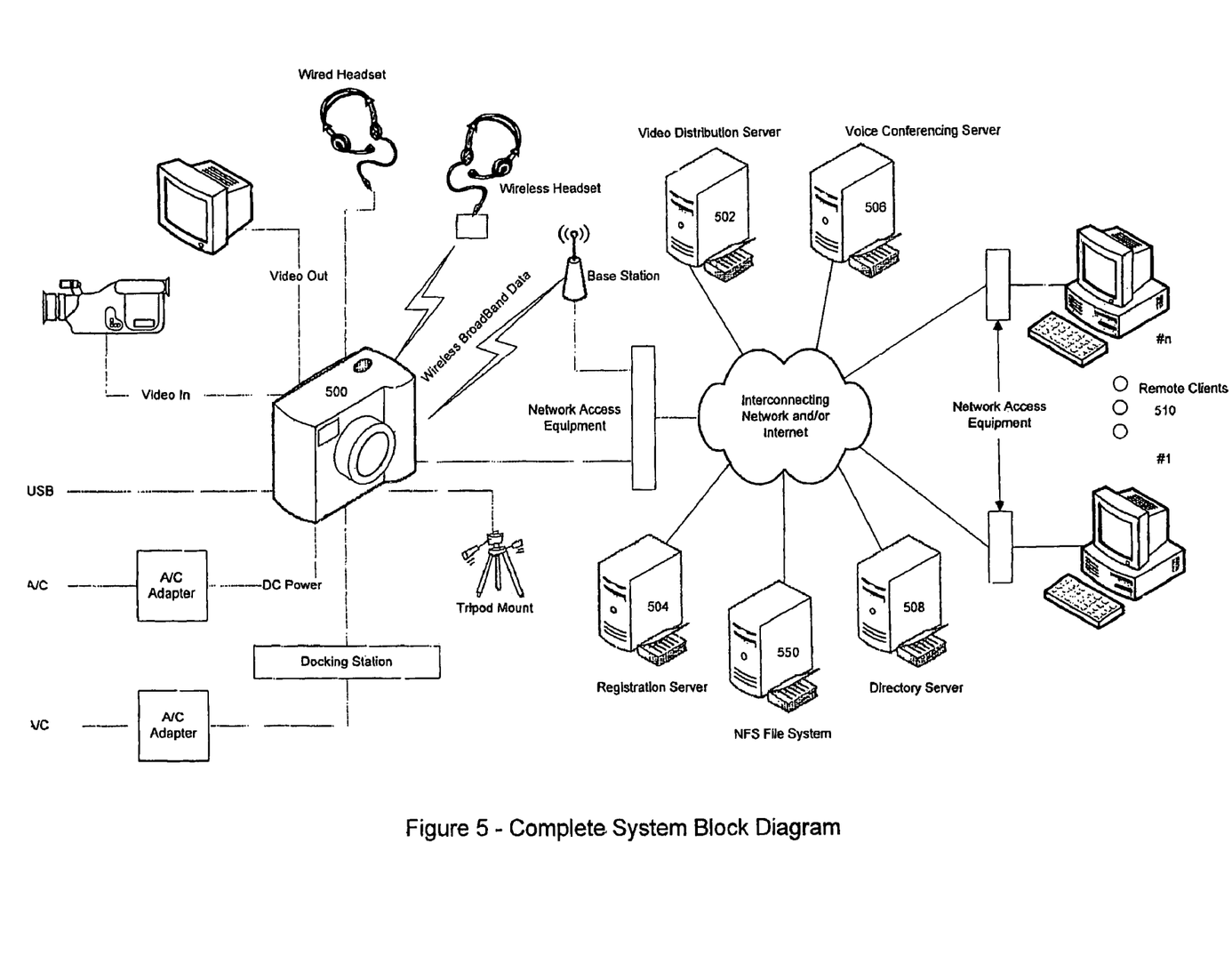
FIG. 5 is a Complete System Block Diagram which illustrates a complete system incorporating all system components.

The Mobile Video Conferencing System (MVCS) is comprised of a Mobile Streaming Camera (MSC) 100/500, a Remote Client (RC) 110/510, a Registration Server 104/504, a Directory Server 108/508, a Video Distribution Server 502 and a Voice Conference Server 506 as illustrated in FIG. 1 and FIG. 5. The following paragraphs describe the purpose/functionality of each.

Remote Client

The Remote Client 110 consists of a computing platform with a display and microphone/speaker system, such as a Personal Computer (PC) or Personal Digital Assistant (PDA) or Smart Phone or a MSC, an operating system such as Windows XP®, Linux, Windows CE or PocketPC or other and specialized application software. The RC allows a RC user (Client) to collaborate with a MSC user (Operator).

Registration Server

The Registration Server 104 consists of a computing platform such as a Personal Computer (PC), an operating system such as Windows XP® or Linux or other and registration software such as provided with a SIP Registrar. The Registration Server provides optional system access and control functions for the MVCS.

Directory Server

The Directory Server consists of a computing platform such as a PC, an operating system such as Windows XP® or Linux or other and LDAP or equivalent directory services software.

Video Distribution Server

The Video Distribution Server consists of a computing platform such as a PC, an operating system such as Windows XP® or Linux or other and functions to reformat and distribute subject video and audio streams from an MSC to multiple RCs.

Voice Conferencing Server

The Voice Conferencing Server consists of a computing platform such as a PC, an operating system such as Windows XP® or Linux or other and functions to combine and distribute voice data to each participant in an MVCS conference telephony call.

Mobile Streaming Camera (MSC)

Figure 2:
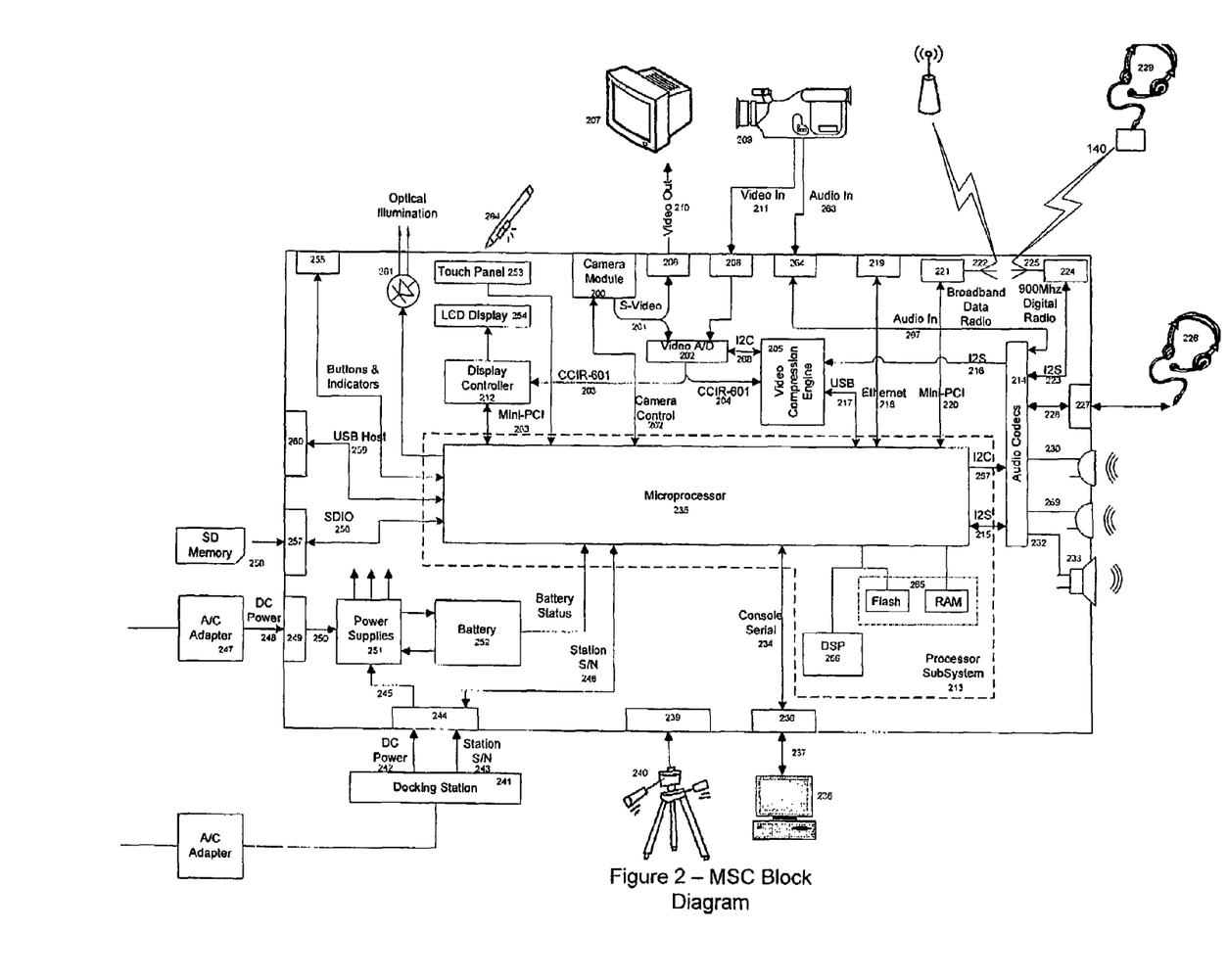
FIG. 2 is a MSC Block Diagram which details the various functional blocks of the Mobile Stream Camera (MSC).

The basic MSC consists of a camera-shaped housing containing a Camera Module 200, two Built-In Microphones 230/269, a Built-In Speaker 233, a Liquid Crystal Display (LCD) 254; a Touch Panel 253, Buttons and Light Emitting Diode (LED) Indicators 255, and other components as illustrated in FIG. 2 which combine to; convert the subject video images captured by the Camera Module 200 and subject audio captured by the Built-In Microphones 231/269 into that suitable for transmission to a RC 110 and; to provide for real time, full duplex, Voice Over IP (VoIP) and video communications between the Operator and Client.

The MSC Processing Subsystem 213 consists of a microprocessor 235, SDRAM and Flash memory 265, I/O circuits, a Digital Signal Processor (DSP) coprocessor 266, embedded Linux or other operating systems such as Microsoft Windows CE.Net, Microsoft Pocket PC, Symbian, Palm OS and, custom MVCS software. The MSC Processor Subsystem 213 provides the computationally intensive video, audio and voice compression/decompression functions, the network communications functions necessary for the MSC 100 to efficiently stream content over IP networks and, the User Interface (UI) and local I/O processing functions for the MSC.

The MSC has a Camera Module 200 to capture subject video. The Camera Module 200 allows the MSC to be used for detailed close in inspection work at a distance of as close as 1 cm as well as longer focal lengths for clear viewing of distant subjects. Video output from the camera is formatted as 768 horizontal by 494 vertical pixel analog S-video 201. The Camera Module 200 provides for control of its operating parameters via a VISCA Interface 262 or equivalent interface. Through the VISCA Interface 262 the MSC can control and obtain status on camera parameters such as Zoom, Zoom speed, Digital Zoom, Manual/Auto Focus, Focus Speed, Auto Exposure modes, Exposure screen location, White Balance Modes, Aperture/Iris Settings, Shutter Speed, Gain, Back light, Mirror Image, Memory Presets, On Screen Display Content, Key Lock, Camera I.D. and Power On/Off.

The MSC has a LCD 254 with integral Backlight. The LCD 254 is used to display video and pictures for the Operator and to present control and status information to the Operator. The integral Backlight is provided to improve the view ability of the LCD 254 in dim lighting conditions.

The MSC has a Display Controller 212 that converts digital pixel data received from the MSC Processing Subsystem via a mini-PCI or equivalent interface 263 and/or the Video A/D converter 202 via CCIR-601 or equivalent interface 203 into those signals needed to drive the LCD 254.

The MSC has a Touch Panel. The Touch Panel 253 overlays on top of the LCD 254 and provide a touch sensitive surface on which the operator can interact with information presented on the LCD 254.

The MSC 100 has a built-in Ethernet interface 218. The MSC 100 can be connected to the Network by plugging a standard Ethernet cable into its Ethernet RJ45 connector 219.

The MSC 100 has a built-in Broadband Data Radio 221 and matching Antenna 222. The MSC 100 can be connected wirelessly to the Network through this radio. Broadband radios used by the MSC conform to the mini-PCI standard and interface to the MSC Processing Subsystem 213 via an internal PCI bus 220. Broadband radio types supported by the MSC include but are not restricted to 802.11, 802.16, 3G and/or 4G cellular.

The MSC 100 has a Built-in Directional Microphone 230 to capture subject audio associated with the subject video.

The MSC 100 has a Built-In Omni-Directional Microphone 269 used to capture the Operator's voice during speaker phone mode VoIP telephony calls with the Client.

The MSC 100 has a Built-in Speaker 233 to play audio associated with pre-recorded video being played back and to play voice audio from the Client during speaker phone mode VoIP communications.

An external Headset 228 can be connected to the MSC 100 via the Audio Jack 227 supplanting the Built-in Speaker and Built-In Omni-Directional Microphone 269 for VoIP communications and the Built-In speaker for audio play back.

The MSC 100 has a USB Host interface 130/259 for connecting the MSC 100 to select client devices. USB connection to the MSC 100 is made by connecting a standard USB A-B cable into the MSC's A receptacle connector 260.

The MSC 100 has an External Optical Illumination System 261 to improve lighting conditions in situations that warrant it. Illumination is provided by one or more banks of white LEDs, or equivalent lighting system, under the control of the MSC Processing Subsystem 213. One bank of LEDs is positioned to provide uniform illumination for distant objects. A second bank of LEDs is positioned to provide illumination for near objects.

Power is provided by an internal, rechargeable battery pack 252, via external power supplied to the MSC 100 by connecting an AC/DC converter 132/247 to the power connector 249 or via external power supplied to the MSC 100 through a Power-Over-Ethernet (POE) interface via the Ethernet interface 219. The MSC's power supply 251 automatically switches to external power when the adaptor is connected and re-charges the internal battery 252.

The MSC 100 has a Tripod Mount 239 for connecting a camera tripod 136/240. The Tripod Mount 239 can also be used to connect other mounting apparatus to the MSC, such as a magnetic mount, to facilitate secure attachment to non-flat surfaces.

Figure 3:
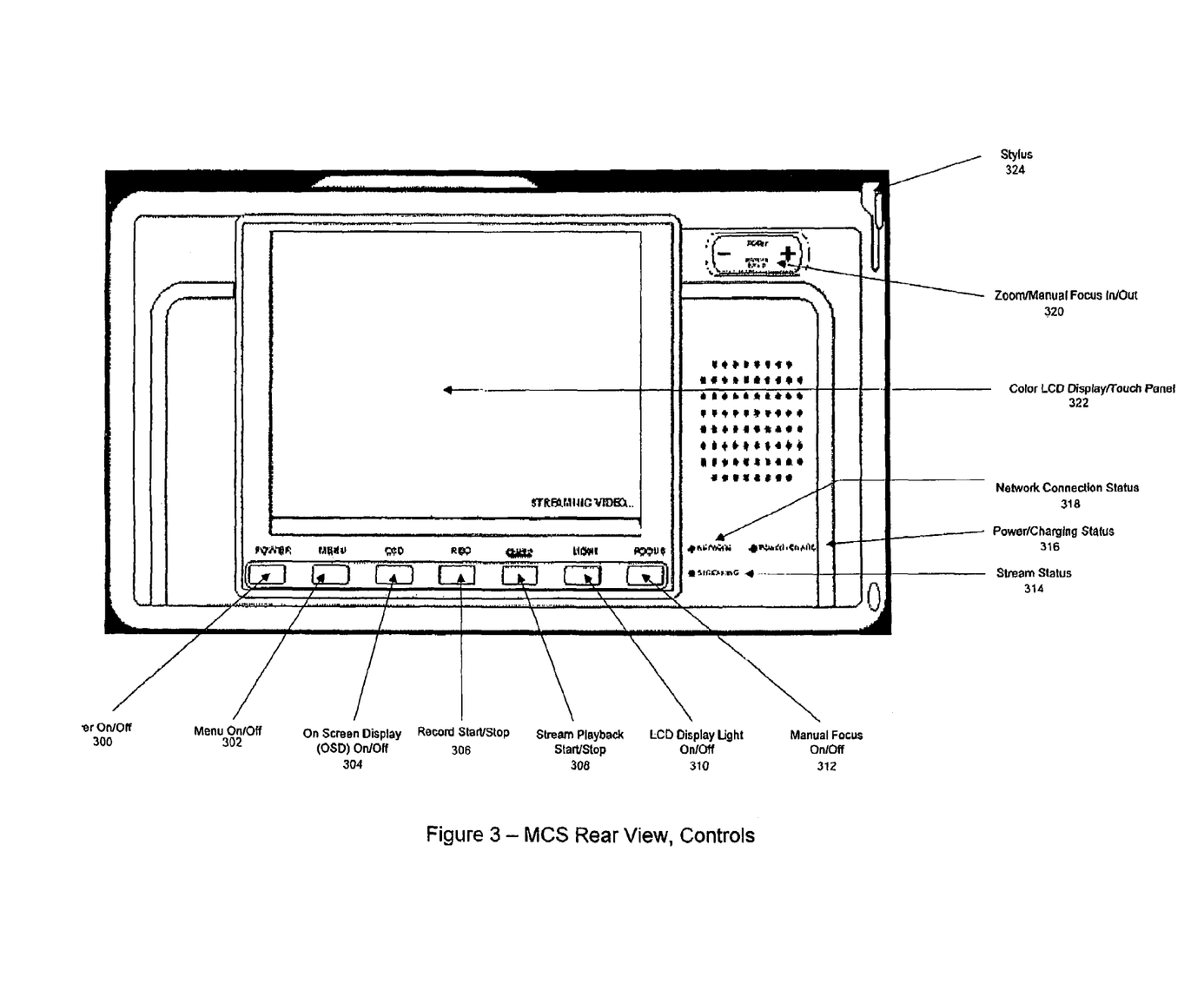
FIG. 3 is a MCS Rear View, Controls which shows a representative rear view of the MSC device and associated controls.
Figure 4:
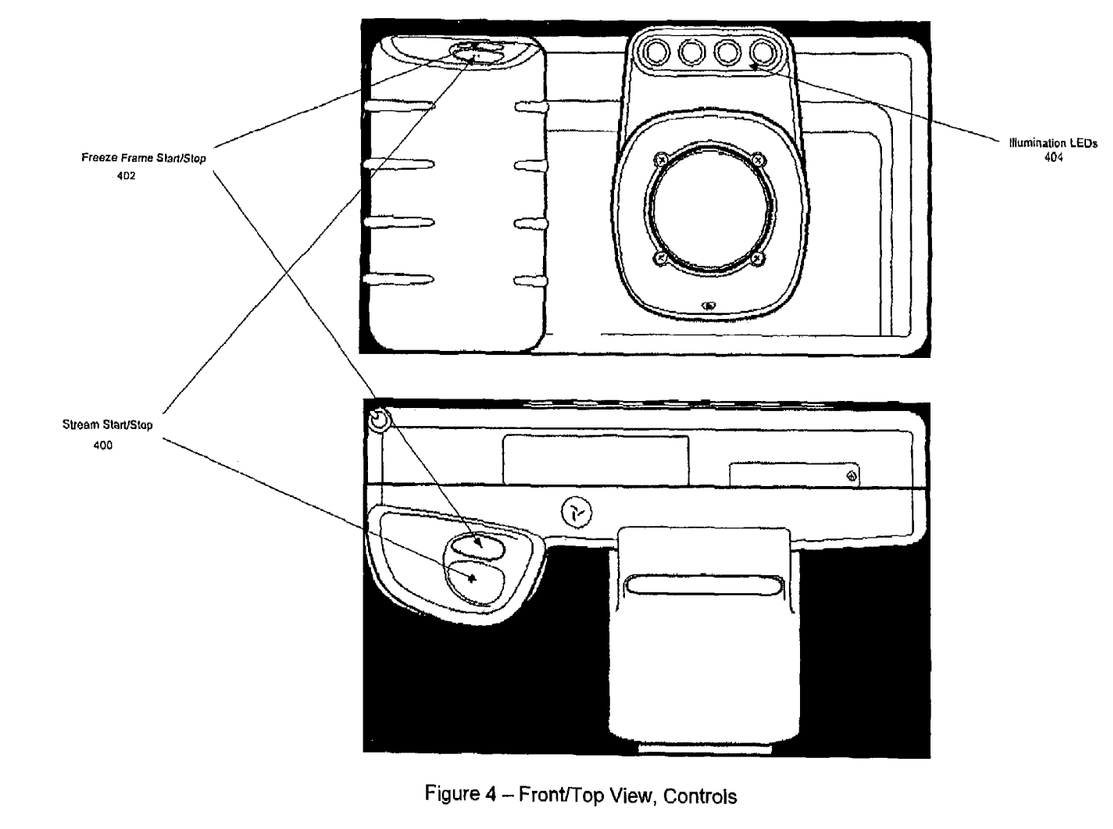
FIG. 4 is a Front/Top View, Controls which shows representative front and top views of the MSC and their associated controls.

Physical buttons with tactile feedback and "soft" buttons implemented with the Touch Panel 253/322 overlaid on top of the LCD 254/322, are provided on the MSC 100 to allow the Operator to control camera functions. Buttons are provided for Power On/Off 300, Menu On/Off 302, On-Screen Display On/Off 304, Record Start/Stop 306, Stream Playback Start/Stop 308, LCD Light On/Off 310, Manual Focus On/Off 312, Camera Zoom-Manual Focus In/Out 320, Stream Start/Stop 400 and, Freeze Frame 402. Physical buttons are interfaced to the MSC Processing Subsystem 213 via discrete I/O circuits 255. The resistive Touch Panel 253/322 is overlaid on top of the LCD 254/322. A stylus 324 and/or the Operator's finger can be used to interact with buttons and menus drawn on the LCD 254/322 under the Touch Panel 253/322.

The MSC 100 provides audible alerts to the Operator. Audible alerts are provided for but not limited to functions such as Stream Start/Stop, Record Start/Stop, Still Image Capture, VoIP Call Ring, VoIP Call Busy, Network Connection status changes, low file system memory indication, low battery indication.

The MSC 100 has dedicated Operator Indicators for Stream Status 314, Power/Charging Status 316 and Network Connection Status 318. These are interfaced to the MSC Processing Subsystem 213 via discrete I/O circuits 255. The LCD 254/322, in conjunction with the Display Controller 212 and the MSC Processing Subsystem 213 are used to display additional visual indicators to an operator.

The MSC 100 has a Secure Digital interface 257, or other interface such as Compact Flash, for installing portable memory cards 258 into the MSC. Installed memory cards are used for uploading/downloading MSC 100 configuration data, for updating the software in the MSC 100 and for record and/or playback of video, audio and pictures.

Operation

The MVCS provides a means for a MSC user (Operator) and a RC user (Client) to communicate and collaborate remotely. Subject video and audio captured by the MSC is digitally processed and transmitted in real time (streamed) to a RC 110 where it is rendered by the RC 110 for viewing and listening (respectively) by the Client. Voice communications between the Operator and the Client are facilitated by a full duplex, Voice-Over-Internet-Protocol (VoIP) communications channel established between the MSC and RC. A Registration Server function 104 and a Directory Server function 108 are used to authenticate and manage system access from the Operator/MSC and Client/RC. Video, Audio and Voice are streamed and control information is transferred, between the MSC, RC and servers, using Internet Protocol (IP) via an interconnecting:

Local Area Network (LAN);
  Wireless Local Area Network (WLAN);
  Wireless Wide Area Network (WWAN);
  the Internet: or;
  any combination thereof.

For the purposes of this document this interconnecting network is called the Network.

The MVCS uses a variety of standard network communication protocols to implement control and streaming functionality. The following list itemizes the major protocols used within one implementation of the MVCS:

Session initiation, control and termination is done using the Session Initiation Protocol (SIP) and the Session Description Protocol (SDP);
  VoIP streams may be either unicast or multicast and are encapsulated in Real-time Transport Protocol (RTP) packets;
  Audio/Video streams may be either unicast or multicast and are encapsulated in RTP packets;
  Real-time Transport Control Protocol (RTCP) is used to monitor real-time stream delivery to permit adjustments to maintain optimum quality;
  Application and data sharing (remote control, image sharing, etc.) utilizes the T.120 standard protocols.

These protocols will be used throughout the remainder of this patent for the purpose of clearly describing the operation of the MVCS. However, other protocols can be used.

The Operator/MSC 100 and Client/RC 110 log into the system using a secure connection to the Registration Server 104 via the Network 102/112/114/116. The MSC 100 and/or RC 110 pass user name and password information to the Registration Server 104 to verify their identity. The SIP Registration Server 104 in turn uses a LDAP or equivalent Directory Server 108 to validate the user name and password information passed to it. If valid, access is granted and, IP address/port information and presence information from the Operator/MSC and/or Client/RC are updated in the Directory Server's 108 databases.

To initiate a connection (call) with a RC/Client the Operator, using display and control capabilities provided by the MSC, enters the RC/Client's IP address/port information into the MSC. The MSC uses SIP (RFC3261) to then establish a connection with that IP Address/port and to negotiate characteristics of the communication using the Session Description Protocol (RFC2327) or similar. Alternatively, the Operator can select a RC/Client's name from a list stored in the MSC that associates names to IP address/port. Alternatively, the Operator can access a list of RC/Client's names and associated IP address/port information from the Directory Server 108 via the Network. The RC can respond to the incoming connection request in ways such as but not limited to: automatically ignore, automatically answer, prompt the Client to manually answer/ignore. In the event that the RC/Client is already engaged in a connection with another MSC the RC will respond to this new connection request as busy. Audible and visual notifications are provided by the RC to the Client and by the MSC to the Operator that the MSC is attempting to connect. In the event that the MSC is not able to make a connection with the RC, a capability is provide to allow the Operator to leave a message consisting of a VoIP voice clip and/or a subject audio and video clip on the RC.

To initiate a connection with an MSC/Operator the Client, using display and control capabilities provided by the RC, enters the MSC/Operator's IP address/port information into the RC. The RC uses SIP (RFC3261) to then establish a connection with that IP Address/port and to negotiate characteristics of the communication using the Session Description Protocol (RFC2327) or similar. Alternatively, the Client can select a MSC/Operator's name from a list stored in the RC that associates names to IP address/port. Alternatively, the Client can access a list of MSC/Operator's names and associated IP address/port information from the Directory Server 108 via the Network. The MSC can respond to the incoming connection request in ways such as but not limited to: automatically ignore, automatically answer, prompt the Operator to manually answer/ignore. In the event that the MSC/Operator is already engaged in a connection with another RC the MSC will respond to this new connection request as busy. Audible and visual notifications are provided by the RC to the Client and by the MSC to the Operator that the RC is attempting to connect. In the event that the RC is not able to make a connection with the MSC, a capability is provide to allow the Operator to leave a message consisting of a VoIP voice clip and/or a subject audio and video clip on the MSC.

The MSC video capability allows an Operator to stream video captured by the MSC 100 to the RC 110 via the Network while viewing the video locally on the LCD 254.

With the MSC turned on, Video captured by the Camera Module 200 is continually fed to the Video A/D converter 202 in analog S-Video format 201. The Video A/D converter 202 converts the analog video into digital video pixel data. This digital video pixel data is then fed to the Display Controller 212 and the Video Compression Engine 205 over CCIR0601 or equivalent interfaces 203 & 204 (respectively).

The Video Compression Engine compresses the digital video pixel data, received from the Video A/D Converter 202, into a highly compressed format using CODECs such as MPEG 4, Windows Media, Real or H.264. The compressed digital video pixel data is collected into packets, time stamped and then fed to the MSC Processing Subsystem 213 via a USB interface 217.

The Media Stream Server, implemented in software within the MSC Processing Subsystem 213 receives the compressed digital video pixel data packets from the Video Compression Engine 205 and formats them as required by the real time transport protocols such as RFC3016 (MPEG4 A/V streams over RTP). When the Operator presses and releases the Stream Start/Stop Button 400 the MSC's Media Stream Server opens a real time transport session with the RC 110, negotiates mutually compatible CODECs for subject video and audio and sends the formatted video packets to the RC 110 through that session via the Network.

The Display Controller 212, under the control of the MSC Processing Subsystem 213, uses the digital video pixel data received directly from the A/D Converter 202 to provide the Operator with a Video Viewfinder capability. To accomplish this the Display Controller 212 formats the received digital video pixel data by buffering, decimating, clipping, cropping and color converting it and then displays the video on the LCD 254 by generating the signals to drive it. Using the control functions provided by the MSC, the Operator can control the decimating, clipping and cropping operations to size the view finder image and to digitally zoom in on a portion of the video.

The MSC video capability is enhanced by providing a connector 206 and interface circuits to route S-Video 201 from the internal Camera Module 200 to an external monitor 207. This capability allows an external monitor, when connected through a standard S-video cable, to be used to view the MSC's video signal. This feature is used, for example, in situations where the LCD is not visible to the Operator or in situations where a physically larger image is desired.

The MSC video capability is enhanced by providing a connector and interface circuits for accepting S-Video from an external video camera when connected with a standard S-Video cable. When this capability is enabled the Video A/D Converter 202 and the Video Compression Engine 205 process video from the External Video-In interface 208 instead of from the internal Camera Module 200.

The MSC video capability is enhanced by a Video Monitor Mode that allows the compressed digital video pixel data packets to be displayed locally on the LCD 254 in parallel with being streamed to the RC 110. This allows the Operator to view the video as it is seen by the Client. Video Monitor mode is accomplished by the MSC Processing Subsystem 213 unpacking and decompressing data packets received from the Video Compression Engine 205 back into digital video pixel data and routing the pixel to the Display Controller 212 for display on the LCD 254.

The MSC video capability is enhanced by allowing the operator to use the Touch Panel 253 and Stylus 264 to designate the location within the subject video image to be used by the Camera Module 200 for exposure control. This capability utilizes the camera's Spot Exposure mode along with the LCD 254, Touch Panel 253 and Stylus 264. With the LCD displaying either View Finder video, Video Monitor video, or both, the operator, touches the Stylus 264 to the Touch Panel 253 surface over top of the point within the displayed video image that is desired to be used for exposure control processing. The MSC Processing Subsystem 213 computes the screen touch location and forwards this data to the Block Camera 200 over the VISCA Interface 262. The Block Camera 200 then uses the designated area to optimize exposure parameters.

The MSC video capability is enhanced by allowing the MSC 100 to receive subject video from the RC 110 or compatible device, and render it on the LCD 254. This video session is initiated by the Client/RC 110 and is established using the same real time protocols as those used to allow the MSC 100 to stream video to the RC 110 and, uses the same compression CODECs, MPEG4, Real, Windows Media, H.264. RC110 compressed video packets received by the MSC Processing Subsystem 213 from the RC 110 via the Network are unpacked into compressed digital video pixel data packets. The MSC Processing Subsystem 213 then decompresses the compressed digital video pixel data packets into digital video pixel data using the negotiated CODEC and forwards the data to the Display Controller 212 for formatting and display on the LCD 254.

The MSC video capability allows the LCD 254 to display View Finder video, Video Monitor video, RC 110 video or combinations there of simultaneously in separate windows.

Subject illumination can be improved by using the MSC's Illumination System 261. The Illumination System 261 brightness level can be controlled by the Operator, by the Client via the remote control functions of the RC 110 and, automatically under MSC software control. Under software control, the MSC computes the ambient lighting conditions using exposure parameters reported by the Camera Module 200 including but not limited to iris, shutter speed and gain, and adjusts the External Optical Illumination system's 261 light output to maintain minimum acceptable ambient light conditions. This algorithm allows for on/off control with preset control of the on brightness level as well as for continuous and variable light output control. Similarly, using focal length information provided by the Camera Module 200, the MSC software will turn on the LEDs banks that best match the distance that the object is away from the camera.

The MSC allows the Client, through the use of a mouse or other pointing device connected to the RC 110, to control a cursor displayed on the LCD 254. This capability allows the Client to point to items within the video being displayed on the LCD 254. This capability is further enhanced by allowing the Client to draw images on top of the video being displayed on the LCD 254. Conversely, this capability allows the Operator to use the Touch Panel 253 and Stylus 264 to remotely control a cursor on the RC's display and allows the Operator to draw images on top of the MSC's video being displayed on the RC 110.

The MSC audio capability allows the MSC 100 to stream digital audio associated with captured video to a RC 110 via the Network. The MSC 100 maintains time synchronization between audio and video streams.

Audio captured by the Built-In Directional Microphone 230 is fed in analog format to the Audio Codec Subsystem 214 where it is converted in real time into Pulse Code Modulation (PCM) digital audio data. This PCM digital audio data is transferred to the Video Compression Engine 205 via an I2S serial interface 216. The Video Compression Engine 205 collects the received PCM digital audio data into packets and time synchronizes them to the compressed digital video using time stamping and then forwards the synchronized PCM digital audio data packets to the MSC Processing Subsystem 213 via a USB interface 217.

The MSC Processing Subsystem 213, compresses the PCM digital audio data received from the Video Compression Engine 205 into MPEG 1 layer 3 audio (MP3) or AAC or other video compatible audio compression format. The Media Stream Server, implemented in software within the MSC Processing Subsystem 213 then formats it as required by the real time transport session protocols such as RFC3016 (MPEG4 A/V streams over RTP). When an Operator presses and releases the Stream Start/Stop Button 400 the MSC's Media Stream Server opens a real time transport session with the RC 110 via the Network and sends the formatted audio packets to the client through that session.

The MSC audio capability is enhanced by providing a connector and interface circuits for accepting External Audio 263 from an external video camera, or other external microphone source, when connected with a standard RCA jack audio cable to the External Audio-In interface 264. When enabled External Audio 263 is processed as subject audio instead of audio from the Built-In Directional Microphone 230.

The MSC allows the Operator to listen to subject audio being captured by the MSC and streamed to the Client/RC. By listening to subject audio the Operator can monitor the quality of the audio being streamed to the Client/RC. This is called Audio Monitor. Audio Monitor Mode is implemented by the MSC Processing Subsystem 213 and causes audio for the Built-In Directional Microphone 230 or External Audio 263 source to be routed to a connected Headset 228/229. Audio Monitor Mode is controlled by the Operator using display and control functions provided by the MSC. Through these controls the Operator can chose to listen to; Client VoIP Audio only; subject audio only or; both mixed together.

The MSC audio capability is enhanced by allowing the MSC 100 to receive subject audio from the RC 110 or compatible device, and output it to the speaker 253. This audio session is initiated by the Client/RC 110 and is established using the same real time protocols as those used to allow the MSC 100 to stream audio to the RC110 and, uses the same compression CODECs, (MP3, AAC). Compressed audio packets received by the MSC Processing Subsystem 213 from the RC 110 via the Network are unpacked and decompressed using the negotiated CODEC. The MSC Processing Subsystem 213 then streams it to the Audio Codec Subsystem 214 via I2S interface 215. The Audio CODEC Subsystem 214 converts the received PCM digital audio data into an analog signal, filters and amplifies it and routes it to the Built-in Speaker 233 and/or the speaker of a connected Headset 228.

The MSC voice capability allows an Operator to initiate or receive a VoIP telephone call with a Client, at the same time as the MSC 100 is streaming video, audio and pictures to the RC 110 via the Network. The call is established using Session Initiation Protocol (SIP). The Operator uses a Headset 228 connected via the Audio Jack 227 or the MSC's speaker phone capability for VoIP telephone calls. The speaker phone capability utilizes the Built-In Omni-Directional Microphone 269 and Built-In Speaker 233 in conjunction with echo cancellation software running on the MSC Processing Subsystem 213 to provide hands-free, full duplex operation.

Microphone audio from an external Headset 228, connected via the Audio Jack 227, is fed in analog format to the Audio Codec Subsystem 214 where it is converted in real time into Pulse Code Modulation (PCM) digital audio data. The PCM digital audio data is then transferred to the MSC Processor Subsystem 213 via I2S interface 215.

Audio from the Built-In Omni-Directional Microphone 269 is fed in analog format to the Audio Codec Subsystem 214 where it is converted in real time into Pulse Code Modulation (PCM) digital audio data. The PCM digital audio data is then transferred to the MSC Processing Subsystem 213 via I2S interface 215.

The MSC Processing Subsystem 213 receives Built-in Omni-Directional Microphone 230 and Headset Microphone 228 PCM digital audio data directly from the Audio Codec Subsystem 214 via an I2S interface 215. The MSC Processing Subsystem 213 performs echo cancellation operations on this data and then compresses it using CODECs such as G.711, G.723, G.729, GSM or other VoIP appropriate CODECs. This compressed voice data is then formatted into packets and streamed to a RC 110 via the Network.

VoIP data packets received from the RC 110 via the Network are unpacked and decompressed back into PCM digital audio data by the MSC Processing Subsystem 213 using the appropriate CODEC, such as G.711, G.723, G.729, GSM or other. The MSC Processing Subsystem 213 then streams it to the Audio Codec Subsystem 214 via I2S interface 215. The Audio CODEC Subsystem 214 converts the received PCM digital audio data into an analog signal, filters and amplifies it and routes it to the Built-in Speaker 233 and/or the speaker of a connected Headset 228.

The MSC audio capabilities are enhanced by the MSC Processing Subsystem's 213 separate processing of subject audio and the Operator's voice audio. By processing and streaming these sources separately the Client can control the RC 110 to play subject audio only, Operator's VoIP audio only or the two audio sources mixed together.

The audio and voice capabilities of the MSC 100 are enhanced by allowing the use of a Wireless Headset 229 instead of a wired head set 228. The MSC 100 provides a 900 MHz ISM band digital radio 224, or other equivalent radio system, and an Antenna 225 to send/receive PCM digital audio data to/from a compatible Wireless Headset 229. When the wireless headset feature is enabled PCM digital audio data is routed from the Audio Codec Subsystem 214 to the 900 MHz ISM band digital radio link 224/225 via a bi-directional I2S serial interface 223 where it is modulated and transmitted to an associated Wireless Headset 229. Likewise, PCM digital audio data demodulated by the 900

MHz ISM band digital radio link 224/225 from the wireless headset 229 is routed to the Audio Codec Subsystem 214 over the I2S interface 223.

The wireless headset capability is enhanced by providing multiple independent bi-directional radio channels to eliminate interference between co-located MVCS systems and their associated wireless headsets.

Two realizations of the Wireless Headset 229 are provided. The first version embeds the digital radio and battery power source into the headset. The second version utilizes a small, wearable, module (Dongle) to house the digital radio and battery power source. An external connector is provided on the Dongle to allow compatible wired headsets to be plugged in thus allowing for a broader selection of headset to be used while still maintaining a wireless connection between the Operator and the MSC 100.

The video, audio and voice capabilities of the MSC 100 are enhanced by its ability to adapt to the available network bandwidth and reliability between it and the RC 110. This is accomplished by the RC 110 collecting and reporting session performance metrics, about the end-to-end network connection between it and the MSC 100, back to the MSC 100 using the Real time Transport Control Protocol (RTCP (RFC1889)) or similar protocol. Metrics reported include but are not limited to lost packet rate, packet latency and packet jitter. Using this reported data the MSC 100 then adjust the video, audio and voice data stream parameters according to a pre-defined algorithm to optimize the quality delivered to the RC 110 for the available connection.

The video, audio and voice capabilities of the MSC 100 are enhanced by allowing compressed video, audio and voice streams to be stored in the MSC's local file storage system 265 and/or installed portable memory cards 258 and/or USB memory modules connected via the USB Host interface 259/260 and/or to a Network File System (NFS) storage facility 150. This capability operates independent of the MSC 100 streaming it to the RC 110. The files are automatically named and can be manually renamed if desired. The files are automatically tagged with information such as the date, time, encoding information and the identities of the Operator, Client and MSC that were involved in the session. The Operator can add file description text and voice clip annotation to each item stored.

The MSC video capability is enhanced by allowing an operator to capture still images (pictures) from the video stream and to store them in the local file system 265 or on an installed portable memory card 258 and/or stream them to the RC 110. The files are automatically named and can be manually renamed if desired. The files are automatically tagged with information such as the date, time, encoding information and the identities of the Operator, Client and MSC that were involved in the session. The Operator can add file description text and voice clip annotation to each item stored. Pictures are captured by the Operator pressing and releasing the Freeze Frame 402 button. Associated with this action the MSC 100 will capture the next video frame provided by the camera, produce an audible alert such as a camera shutter sound to indicate that an image has been captured, format the image into a JPEG, TIFF, BMP or other image format, and display the captured image to for the Operator on the LCD 254. The MSC 100 will then provide the operator with options for saving, the images, transmitting the image to a Remote Client 110 or discarding the image.

The video, audio and voice capabilities of the MSC 100 are enhanced by allowing video, audio, voice and pictures stored in the MSC's local file storage system 265 or in an installed portable memory card 258 or in a USB memory modules connected via the USB Host interface 259/260 or to a Network File System (NFS) storage facility 150 to be retrieved and played back on the MSC 100 and/or streamed to the RC 110. This content can be played, paused, rewound, searched, stopped and fast forwarded with Buttons 255 and 300 through 312 and Touch Panel 253/322 controls provided on the device. The MSC Processing Subsystem 213 acquires the data from the storage medium, decompresses formats and forwards it to the Display Controller 212 which in turn displays it on the LCD 254. Concurrently the MSC Processing Subsystem 213 can transfer the data from the storage medium to a RC 110. Retrieval of stored streams is facilitated through a file viewer application running on the MSC Processing Subsystem 213 and presenting a display on the LCD 254. The file viewer function displays file name, file properties and thumbnail images for each stored item on the LCD 254. The file viewer function provides the ability to play any associated voice annotations via the Built-in Speaker 233 or headsets 228 and 229.

The video, audio and voice capabilities of the MSC 100 are enhanced by allowing video, audio, voice and pictures to be encrypted prior to streaming them to a RC 110. This capability is used in situations where secure transmission of video, audio and voice are required. In this mode, the MSC Processing Subsystem 213 encrypts transport packets prior to providing them to the media stream server function. The MSC Processing Subsystem 213 uses Data Encryption Standard (DES), Triple DESC (3DES) or Advanced Encryption Standard (AES) cryptographic algorithms for this purpose.

A backlight is provided to improve view ability of the LCD in low light conditions. The LCD's Backlight can be adjusted using MSC electronics and software. The MSC software allows the Operator to manually control the brightness level by selecting the desired level from a menu displayed on the LCD 254 or automatically by using exposure settings reported by the camera module, such as but not limited to iris, shutter speed and gain. Using these settings the MSC computes the ambient light levels and adjusts the backlight brightness to match those conditions.

Remote control can be applied to the MSC 100 from a RC 110 by communicating commands to the MSC 100 over the Network or from a host computer over the USB Host interface. A RC can use this capability to set key compression parameters of the MSC 100 including:—audio and video codec selection, audio format, video size, frame rate, video bit rate, key frame interval, buffer size, video smoothness, decoder complexity, crop method, de-interlace processing, inverse telecine processing, pixel format, time code generation, and packet size. The RC can also use this capability to control live and stored content stream functions including:—Stream Start/Stop/Pause, Record Start/Stop, Rewind, Shuttle Back, Shuttle Forward, Fast Forward, Tele Zoom, Wide Zoom, Manual Focus On/Off, Focus In/Out, Still Capture.

Connecting the MSC 100 to a keyboard via the USB Host interface 259/260 allow the camera operator to locally control all aspects of the MSC's operation and configuration. Connecting the MSC 100 to a USB memory module client via USB Host 259/260 provides the ability to upload configuration data to the device, to stream content to the memory module for storage and to play back previously stored content. The devices' USB Host interface 259/260 also provides the capability to connect to remote control devices such as a motorized Tripod 240 thus giving the MSC 100 and RC 110 the capability to control the physical orientation of the device.

The MSC 100 provides an interface 244 to an external Docking Station 241 allowing the MSC 100 to obtain DC power 242 and unique serial number information 243 from the Docking Station 241. DC power 245 is routed to the MSC's power supply and used to run the MSC 100 and charge the internal battery. Unique serial number information from a Docking Station 241 is used to assist with locating the device. This is accomplished using a docking station in a known, fixed location. A MSC 100 reporting a docking station serial number to a RC 110 implies that the MSC 100 is at the same location as the docking station. The Docking Station unique serial number information 243 is read by the MSC Processing Subsystem 213. The MSC Processing Subsystem 213 streams this information to a RC 110 via the Network.

The MSC 100 provides a capability to measure the straight line distance between the MSC 100 and the subject utilizing focus information provided by the Camera Module 200. Using focal length and aperture data received from the Camera Module 200 the MSC Processing Subsystem (213) computes an estimate of the average distance to the subject and makes this data available on the LCD Display 254 and to the RC 210.

The MSC 500 is enhanced by allowing multiple RCs 510 to interact with a single MSC 500 at the same time. RCs 510 can view the video and hear the audio streamed by the MSC 500, can remotely control the MSC 500 and can participate in a VoIP conference call session with the MSC 500.

Video and Audio support for multiple RCs 510 is accomplished by the addition of a Video Distribution Server function 502. The Video Distribution Server 502 works in conjunction with a Registration Server 504 to establish SIP Video and Audio sessions between the MSC 500 and participating RCs 510. Once sessions have been established the MSC 500 streams best-quality video and audio streams to the Video Distribution Server 502 which in turn distributes the streams to each RC 510. Each RC 510 can control audio and video codec selection, audio format, video size, frame rate, video bit rate, key frame interval, buffer size, video smoothness, decoder complexity, crop method, de-interlace processing, inverse telecine processing, pixel format, time code generation, and packet size of the streams presented to it by the video Distribution Server 502. This is accomplished through software running on the Video Distribution Server which decodes the best-quality streams received from the MSC 100 and re-encodes them according to the characteristics set by each RC 510. The Video Distribution Server then streams the re-encoded video streams to the RCs 510 via the Network.

A VoIP Conference Call capability is provided in multiple RC situations through the use of a Voice Conferencing Server function 506. The Conferencing Server 506 works in conjunction with a Registration Server 504 to establish a SIP voice session between the MSC 100 and RCs 510. Once a session has been established each participant (MSC 100 and RCs 510) compresses its microphone audio, using a previously negotiated VoIP CODEC, and streams it to the Voice Conferencing Server 506 via the Network. The Voice Conferencing Server receives these VoIP input streams via its network interface, decodes and normalizes each creating PCM digital voice audio streams. It creates unique, VoIP output data streams to stream back to each participant by summing together the PCM digital voice audio input streams from each participant other than the one that the stream is being sent to. One such stream is created for each participant. Each stream is then compressed using a previously negotiated VoIP CODEC and streamed back to the target participant as VoIP data streams via the Network.

The Video Distribution and VoIP Conference Call capabilities are enhanced by their ability to adapt to the available network bandwidth between them and the RCs 510 and between them and the MSC 500. Each RC 510 collects and reports performance statistics about the end-to-end network connection between it and the Servers to the Servers. Similarly the Servers report back end-to-end network connection performance metrics between them and the MSC 500 back to the MSC 500. Metrics reported include but are not limited to lost packet rate, packet latency and packet jitter. Using these reported data the Servers and the MSC 500 then adjust their stream data parameters for video, audio and voice according to a pre-defined algorithm to optimize the quality delivered to the RC and Servers (respectively), for the available connection.

The invention claimed is:

1. A method for communication between a first location having an object to be viewed and at least one of a plurality of remote clients at a respective location remote from the object to be viewed, the method comprising:
   providing at the first location a mobile streaming camera, operable by an operator, the mobile streaming camera comprising:
      an integral mobile camera housing arranged to be carried as an integral unit by the operator;
      a battery power supply mounted in the housing;
      a camera module and lens therefor mounted on the camera housing;
      the camera module being arranged for viewing in a direction of view away from a front of the housing toward an object to be viewed;
      a manual control input for manual control by the operator of the camera module and lens for generating video signals with the camera module and lens being arranged to be directed toward the object to be viewed;
      a video display carried on the mobile camera housing for displaying to the operator video signals;
      the video display being arranged to be viewed by the operator when the operator points the camera module at the object to be viewed;
      a touch panel associated with the video display for the operator to draw images on the video display;
      an audio output for supplying audio communications to the operator;
      a directional microphone arranged to be directed with the camera module and lens toward the object to be viewed for capturing audio from the object to be viewed as a first audio signal;
      an omni-directional microphone for capturing voice at locations around the omni-directional microphone as a second audio signal;
      network connections for wireless connection to a network;
      a processing subsystem in the housing;
      and a memory device associated with the processing subsystem;
   providing at the remote location remote from the mobile streaming camera a computing platform for operation by the remote client, the computer platform comprising:
      a video display;
      an audio output for audio and voice;
      an audio input for voice;

a network connection for connection to the network;
a manual input;
and a processing subsystem;
connecting the mobile streaming camera at the first location and the computing platform at the remote location through a network;
providing a registration server and a directory server on the network;
using the registration server and directory server to enable a connection between the mobile streaming camera at the first location and the computer device at the second location in the event that name and password information confirm their identities;
using the registration server and directory server to obtain address information and presence information about the plurality of remote clients necessary to establish connections with them;
operating the camera module to obtain video images of the object to be viewed;
causing the processing subsystem of the mobile streaming camera to receive the video images from the camera module and the first audio signal and the second audio signal and to compress the video, first audio signal and second audio signal;
causing the processing subsystem of the mobile streaming camera to provide communications protocols and communicating the video and first and second audio signals for transmission in real time to the network;
causing the processing subsystem of the mobile streaming camera to communicate the first audio signal independently from the second audio signal the network;
causing the processing subsystem of the mobile streaming camera to provide a full duplex telephony speaker phone capability, utilizing echo cancellation for the first audio signal;
causing the processing subsystem of the mobile streaming camera to receive from the network compressed video and audio signals and to decompress the signals for, in real time, display of the video signals on the display and output of the audio signals to the operator;
causing the processing subsystem of the mobile streaming camera to display the drawn images by the operator on the video display of the mobile streaming camera;
drawing images on top of the video being displayed on the video display;
causing the processing subsystem of the mobile streaming camera to transmit the drawn images from the touch panel on the network to the Remote Client;
causing the processing subsystem of the mobile streaming camera to store video from the camera module to the memory device;
causing the processing subsystem of the mobile streaming camera to retrieve video stored on the memory device and to stream the stored video over the network to the Remote Client;
causing the processing subsystem of the mobile streaming camera to receive and display video signals on the display and output the audio to the operator from the network so as to play streamed content from the Remote Client,
causing the processing subsystem of the remote client to receive compressed video, first and second audio signals from the mobile streaming camera through the network for decompression and output in real time on the display and the audio output;
causing the processing subsystem of the remote client to provide communications protocols for communication of audio signals for transmission in real time to the network;
and causing the processing subsystem of the remote client to display on the video display of the remote client the drawn images received on the network from the mobile streaming camera in association with the video signals.

2. The method according to claim 1 including providing a conferencing server on the network and causing the processing subsystem of the mobile streaming camera to initiate, receiver and participate in a mobile conference call with multiple ones of said Remote Clients through the conferencing server.

3. The method according to claim 1 including providing a video distribution server on the network and causing the processing subsystem of the mobile streaming camera to distribute video streams to multiple ones of said Remote Clients through the video distribution Server.

4. The method according to claim 1 wherein the mobile streaming camera includes an illumination system and causing the processing subsystem of the mobile streaming camera to control illumination brightness levels remotely by the at least one Remote Client.

5. The method according to claim 1 including causing the processing subsystem of the mobile streaming camera to encrypt all or some of the content transferred to the at least one Remote Client using an encryption algorithm and causing the processing subsystem of the mobile streaming camera to decrypt encrypted content received from the at least one Remote Client using an encryption algorithm.

6. The method according to claim 1 including causing the processing subsystem of the mobile streaming camera to receive remote control signals supplied by the at least one Remote Client and to communicate those signals to the camera module so as to provide a Remote Control capability that allows the at least one Remote Client to control the functions of the camera module.

7. A method for communication between a first location having an object to be viewed and at least one of a plurality of remote clients at a respective location remote from the object to be viewed, the method comprising:
providing at the first location a mobile streaming camera, operable by an operator, the mobile streaming camera comprising:
an integral mobile camera housing arranged to be carried as an integral unit by the operator;
a battery power supply mounted in the housing;
a camera module and lens therefor mounted on the camera housing;
the camera module being arranged for viewing in a direction of view away from a front of the housing toward an object to be viewed;
a manual control input for manual control by the operator of the camera module and lens for generating video signals with the camera module and lens being arranged to be directed toward the object to be viewed;
a video display carried on the mobile camera housing for displaying to the operator video signals:
the video display being arranged to be viewed by the operator when the operator points the camera module at the object to be viewed;
a touch panel associated with the video display for the operator to draw images on the video display;
an audio output for supplying audio communications to the operator;

at least one audio input for receiving audio communications;
network connections for wireless connection to a network;
a processing subsystem in the housing;
and a memory device associated with the processing subsystem;
providing at the remote location remote from the mobile streaming camera a computing platform for operation by the remote client, the computer platform comprising:
a video display;
an audio output for audio and voice;
an audio input for voice;
a network connection for connection to the network;
a manual input;
and a processing subsystem;
connecting the mobile streaming camera at the first location and the computing platform at the remote location through a network;
providing a registration server and a directory server on the network;
using the registration server and directory server to enable a connection between the mobile streaming camera at the first location and the computer device at the second location in the event that name and password information confirm their identities;
using the registration server and directory server to obtain address information and presence information about the plurality of remote clients necessary to establish connections with them;
operating the camera module to obtain video images of the object to be viewed;
causing the processing subsystem of the mobile streaming camera to receive the video images from the camera module and said at least one audio input and to compress the video and said at least one audio input;
causing the processing subsystem of the mobile streaming camera to provide communications protocols and communicating the video and said at least one audio input for transmission in real time to the network;
causing the processing subsystem of the mobile streaming camera to receive from the network compressed video and audio signals and to decompress the signals for, in real time, display of the video signals on the display and output of the audio signals to the operator;
causing the processing subsystem of the mobile streaming camera to display the drawn images by the operator on the video display of the mobile streaming camera;
drawing images on top of the video being displayed on the video display;
causing the processing subsystem of the mobile streaming camera to transmit the drawn images from the touch panel on the network to the Remote Client;
causing the processing subsystem of the mobile streaming camera to store video from the camera module to the memory device;
causing the processing subsystem of the mobile streaming camera to retrieve video stored on the memory device and to stream the stored video over the network to the Remote Client;
causing the processing subsystem of the mobile streaming camera to receive and display video signals on the display and output the audio to the operator from the network so as to play streamed content from the Remote Client,
causing the processing subsystem of the remote client to receive compressed video and said at least one audio input from the mobile streaming camera through the network for decompression and output in real time on the display and the audio output;
causing the processing subsystem of the remote client to provide communications protocols for communication of audio signals for transmission in real time to the network;
and causing the processing subsystem of the remote client to display on the video display of the remote client the drawn images received on the network from the mobile streaming camera in association with the video signals.

8. The method according to claim 7 including providing a conferencing server on the network and causing the processing subsystem of the mobile streaming camera to initiate, receive, and participate in a mobile conference call with multiple ones of said Remote Clients through the conferencing server.

9. The method according to claim 7 including providing a video distribution server on the network and causing the processing subsystem of the mobile streaming camera to distribute video streams to multiple ones of said Remote Clients through the video distribution Server.

10. The method according to claim 7 wherein the mobile streaming camera Includes an illumination system and causing the processing subsystem of the mobile streaming camera to control illumination brightness levels remotely by the at least one Remote Client.

11. The method according to claim 7 including causing the processing subsystem of the mobile streaming camera to encrypt all or some of the content transferred to the at least one Remote Client using an encryption algorithm and causing the processing subsystem of the mobile streaming camera to decrypt encrypted content received from the at least one Remote Client using an encryption algorithm.

12. The method according to claim 7 including causing the processing subsystem of the mobile streaming camera to receive remote control signals supplied by the at least one Remote Client and to communicate those signals to the camera module so as to provide a Remote Control capability that allows the at least one Remote Client to control the functions of the camera module.

13. A method for communication between a first location having an object to be viewed and at least one of a plurality of remote clients at a respective location remote from the object to be viewed, the method comprising:
providing at the first location a mobile streaming camera, operable by an operator, the mobile streaming camera comprising:
an integral mobile camera housing arranged to be carried as an integral unit by the operator;
a battery power supply mounted in the housing;
a camera module and lens therefor mounted on the camera housing;
the camera module being arranged for viewing in a direction of view away from a front of the housing toward an object to be viewed;
a manual control input for manual control by the operator of the camera module and lens for generating video signals with the camera module and lens being arranged to be directed toward the object to be viewed;
a video display carried on the mobile camera housing for displaying to the operator video signals;

the video display being arranged to be viewed by the operator when the operator points the camera module at the object to be viewed;
a touch panel associated with the video display for the operator to draw images on the video display;
an audio output for supplying audio communications to the operator;
a directional microphone arranged to be directed with the camera module and lens toward the object to be viewed for capturing audio from the object to be viewed as a first audio signal;
an omni-directional microphone for capturing voice at locations around the omni-directional microphone as a second audio signal:
network connections for wireless connection to a network;
a processing subsystem in the housing;
and a memory device associated with the processing subsystem;
providing at the remote location remote from the mobile streaming camera a computing platform for operation by the remote client, the computer platform comprising:
a video display;
an audio output for audio and voice;
an audio input for voice:
a network connection for connection to the network;
a manual input;
and a processing subsystem;
connecting the mobile streaming camera at the first location and the computing platform at the remote location through a network;
operating the camera module to obtain video images of the object to be viewed;
causing the processing subsystem of the mobile streaming camera to receive the video images from the camera module and the first audio signal and the second audio signal and to compress the video, first audio signal and second audio signal;
causing the processing subsystem of the mobile streaming camera to provide communications protocols and communicating the video and first and second audio signals for transmission In real time to the network;
causing the processing subsystem of the mobile streaming camera to communicate the first audio signal Independently from the second audio signal the network;
causing the processing subsystem of the mobile streaming camera to provide a full duplex telephony speaker phone capability, utilizing echo cancellation for the first audio signal;
causing the processing subsystem of the mobile streaming camera to receive from the network compressed video and audio signals and to decompress the signals for, in real time, display of the video signals on the display and output of the audio signals to the operator;
causing the processing subsystem of the mobile streaming camera to display the drawn images by the operator on the video display of the mobile streaming camera;
drawing images on top of the video being displayed on the video display;
causing the processing subsystem of the mobile streaming camera to transmit the drawn images from the touch panel on the network to the Remote Client;
causing the processing subsystem of the mobile streaming camera to store video from the camera module to the memory device;
causing the processing subsystem of the mobile streaming camera to retrieve video stored on the memory device and to stream the stored video over the network to the Remote Client;
causing the processing subsystem of the mobile streaming camera to receive and display video signals on the display and output the audio to the operator from the network so as to play streamed content from the Remote Client,
causing the processing subsystem of the remote client to receive compressed video, first and second audio signals from the mobile streaming camera through the network for decompression and output in real time on the display and the audio output;
causing the processing subsystem of the remote client to provide communications protocols for communication of audio signals for transmission in real time to the network;
and causing the processing subsystem of the remote client to display on the video display of the remote client the drawn images received on the network from the mobile streaming camera in association with the video signals.

14. The method according to claim 13 including providing a conferencing server on the network and causing the processing subsystem of the mobile streaming camera to initiate, receive, and participate in a mobile conference call with multiple ones of said Remote Clients through the conferencing server.

15. The method according to claim 13 including providing a video distribution server on the network and causing the processing subsystem of the mobile streaming camera to distribute video streams to multiple ones of said Remote Clients through the video distribution Server.

16. The method according to claim 13 wherein the mobile streaming camera includes an illumination system and causing the processing subsystem of the mobile streaming camera to control illumination brightness levels remotely by the at least one Remote Client.

17. The method according to claim 13 including providing secure transmission by providing a registration server and directory server to enable a connection between the mobile streaming camera at the first location and the computer device at the second location only in the event that name and password information confirm their identities and by causing the processing subsystem of the mobile streaming camera to encrypt all or some of the content transferred to the at least one Remote Client using an encryption algorithm and causing the processing subsystem of the mobile streaming camera to decrypt encrypted content received from the at least one Remote Client using an encryption algorithm.

18. The method according to claim 13 including causing the processing subsystem of the mobile streaming camera to receive remote control signals supplied by the at least one Remote Client and to communicate those signals to the camera module so as to provide a Remote Control capability that allows the at least one Remote Client to control the functions of the camera module.

* * * * *